CONTROL OF REMOTE TELEPHONE AND LIKE EQUIPMENTS

Filed March 13, 1963 5 Sheets-Sheet 1

CONTROL OF REMOTE TELEPHONE AND LIKE EQUIPMENTS

Filed March 13, 1963 5 Sheets-Sheet 5

United States Patent Office
3,317,895
Patented May 2, 1967

3,317,895

CONTROL OF REMOTE TELEPHONE AND LIKE EQUIPMENTS

Robert Victor Cavin, Paris, and Marcel Feuillepain, Sainte-Genevieve-des-Bois, France, assignors to International Standard Electric Corporation, New York, N.Y., a corporation of Delaware
Filed Mar. 13, 1963, Ser. No. 264,912
Claims priority, application France, Mar. 14, 1962, 891,055, Patent 82,225
4 Claims. (Cl. 340—147)

This invention relates to improvements, changes or additions in the United States patent application of A. J. Henquet, R. V. Cavin, and M. Feuillepain, Ser. No. 174,760, filed Feb. 21, 1962 now Patent No. 3,204,041.

The present invention relates to circuits for remote transmission, in one or another direction, of coded numerical information. Signals are in the form of a sequence of binary digits or bits made up of pulses the polarity of which may alternate between positive and negative relative to an arbitrary 0 level.

Transmitting circuits of this type are described in the noted United States Patent No. 3,204,041 and also in French Patent Nos. 1,162,638 and 73,209. These circuits used two trunks, one for transmitting timing pulses (moment timing) by means of alternative pulses (+/—), and the other for transmitting the binary contents of each moment, i.e. the number code to be transmitted, by means of pulses controlled according to this code and of one sign or the other (+/0 or —/0), according to the direction of transmission. The pulses were provided by a timed source in the local equipment, and the circuits relating to the two trunks in the remote equipment were loop circuits.

More particularly, the timing pulses operated a step-by-step chain of time frame relays which alternately offered two branches. In the remote chain, the two branches were separated by means of rectifiers for receiving the alternative pulses through the timing trunk. In the local chain, timing pulses were directly applied, alternately to the two branches. In each equipment, a code control circuit was provided and placed in position according to the information the said equipment had to transmit to the other. The circuits relating to the code trunk in the two equipments comprised also two branches separated by means of rectifiers, each one being utilized for transmission in one direction by means of pulses of a determined polarity. In each equipment, the code control circuit was inserted in the branch utilized for transmitting information from this equipment to the other equipment by controlling the passage of code pulses. The direction of the transmission and consequently the polarity of the code pulses was determined by a device placed in the local equipment. In the two equipments, code receiving relays were connected to the code trunk under the control of time frame relays in order to be selectively operated by code pulses controlled by the code control circuit of the transmitting equipment, so that the coded information in the transmitting equipment was transferred to the code receiving relays in the two equipments.

These well known transmitting circuits operate in a very reliable manner. Each moment of transmission is utilized as moment of the code to permit the transmission of information with a certain redundancy without the sequence of moments becoming too long. A code which may be verified, such as 2 out of 6 or 4 out of 10, is utilized. The timer rate is transmitted by +/— pulses. The pulses remotely transmitted are provided by a local source; they are not dependent upon the remote battery. However all these advantages proceed from the use of two trunks; but two trunks for transmitting information are not always available. For instance, in the case of small capacity concentrators (24 lines), which would be easy to link through normal bundles comprising seven pairs, it would be suitable to allot only one pair for the transmission of line numbers and the six others for the conversations.

Circuits of this type are also known, which use only one trunk for transmitting information. Such circuits have been described in a patent of addition No. 73,067 to French Patent No. 1,187,979. One moment of the transmission out of two was utilized to ensure the timer rate, and one moment out of two for transmitting the code. From the point of view of code transmission, this method allows a redundancy of 100%. In order not to prolong unduly the sequence of moments, a code without redundancy was used in these circuits. The transmission was effected by means of +/— or 0 pulses, and was received on a branch as a series of +/0 pulses for the timer rate, and on the other branch, one moment out of two, as — or 0 pulses, according to the binary contents of the code moments (the signs + and — being arbitrarily designated in this case). One the other hand, it was necessary to transmit pulses via equipment which transmits its information to the other. This means the transmission must be dependent on the remote battery and that two batteries are needed, one negative and the other positive, in the remote equipment.

The present invention has as an object to provide circuits of a type which utilize only one trunk while keeping certain advantageous features of the dual trunk circuits, mentioned above.

The invention more particularly provides a transmitting circuit in which pulses which are always transmitted by the local equipment and received on a loop in the remote equipment constitute a sequence of +/— pulses which are strong or weak pulses. The remote equipment receiving the timer rate responds to all these pulses, whereas the two local and remote equipments receiving the code, respond as to a logical 1 (or X) or a logical 0, respectively, according to whether they receive strong or weak pulses. The strength of pulses is determined by inserting a resistance in that of the equipments which transmits its information to the other by means of code control circuits. The direction of transmission, which is determined by the local equipment, is signalled to the remote equipment by means of a first moment of code for which the remote equipment is always receiving.

More particularly, the receiving circuit allotted to the trunk in the remote equipment comprises two branches separated by rectifiers for receiving alternative pulses with, in each branch, a responsive relay which responds each time to ensure the timer rate, and a marginal relay which responds only to the strong pulses for receiving the code. The circuit belonging to said trunk in the local equipment comprises two branches for transmitting the alternative pulses. For each branch a marginal relay is provided in the remote circuit. A code control circuit is provided in the two said local and remote circuits so that they may be inserted in the circuit of information transmitting equipment, or suppressed in the circuit of information receiving equipment. More particularly, each of the two circuits comprises a resistance which is short-circuited at determined moments by the code control circuit in the transmitting equipment, and which is short-circuited for all the transmission in the receiving equipment. In each remote or local equipment, there is provided a time frame relay chain with two branches for receiving the alternative pulses, said pulses being directly applied in the local equipment as in the known circuits mentioned above, and through the two timer rate receiving relays in the remote equipment. In each equipment there is also provided a code relay chain which also comprises two branches and which is operated under the control of time frame relays and two code receiving relays (marginal relays), so that the coded information in the transmitting equipment is transferred to the code relays in the two equipments.

According to another feature of the invention, the circuits belonging to the transmitting trunk comprise means which permit the remote equipment to transmit to the local equipment, when these circuits are in rest condition, two distinct weak or strong signals (of the polarity provided for the pending linking between the two equipments), one of which is utilized as an information signal to be transmitted, whereas the other may have any required meaning, e.g. may indicate a faulty condition in the remote equipment, such as the disconnection of the battery. This signal may be transmitted by a wire, and the other wire may be utilized for an appropriate response of the local equipment such as a marking to cause the connection of the battery.

In said circuits according to the invention, all the moments of the transmission are still utilized for transmitting the code, i.e. the transmission of the timer rate does not need any redundancy in the code. It is therefore possible to introduce a determined redundancy by utilizing a code which may be verified such as 2 out of 4 for defining six different numbers without excessively prolonging the transmission. This result is obtained by the use of strong or weak pulses and responsive and marginal relays. In certain applications such as in telephone concentrators, limitation of the transmission distance does not have any practical drawback, being the transmission distance from the concentrator to the exchange. Supply of the subscriber's loop, imposes a stricter limitation.

However, in certain cases, it may be desirable that the transmission distance not be limited by the use of two intensity pulses and marginal relays. It is obvious that the conditions for using a sole trunk and uniform pulses and for transmitting the timer rate can only be fulfilled by use of 100% redundancy in the known circuits mentioned above. The present invention has also in view to provide circuits of the type in question wherein said conditions are fulfilled with a reduced redundancy, so that it is possible to use a code which has its proper redundancy, such as an ascertainable code by slightly increasing the number of the moments of transmission instead of doubling them.

For this purpose, the invention provides a transmitting circuit wherein the pulses which are always transmitted by the local equipment and received on a loop in the remote equipment, constitute a series of pulses the sign of which is alternated, certain of which are omitted, and no more than one is transmitted at a time. The timer rate receiving equipment comprises a memory device (relay) which responds to an omitted pulse after a pulse of a determined sign as well as to a pulse of an opposite sign, whereas the two local and remote code receiving equipments respond according to the presence (X) or absence (0) of pulses. The absence of certain pulses is determined by means of a code control circuit in that of the equipments which transmits its information to the other. The direction of transmission, which is always determined in the local equipment, is signalled to the remote equipment in a first moment of transmission.

More particularly, the circuit belonging to the transmitting trunk in the remote equipment comprises also two branches separated by rectifiers for receiving the alternate pulses with, in each branch, a pulse receiving relay. The circuit belonging to the same trunk in the local equipment comprises also two branches for transmitting the alternate pulses and, in each branch, a relay as in the remote circuit. A code control circuit is provided in the two local and remote circuits, in order to be inserted in the circuit of the information transmitting equipment. Said code control circuits comprise more particularly contacts to cut-off the circuit from the pulses at determined moments of the transmission. The code is such that two suppressed pulses are always separated by at least one maintained pulse either of one sign or the opposite sign. In the two local and remote equipments, a chain of time frame relays comprising two branches for receiving the pulses of alternate sign, is provided. Said pulses are moreover directly applied in the local equipment. In the remote equipment the pulses are applied by two pulse receiving relays in cooperation with a memory relay which, each time a pulse is omitted after a pulse of a determined sign, applies a pulse to the other branch as if the pulse were not omitted. Moreover, in the two equipments, there is also provided a code relay chain which also comprises two branches and which is operated under the control of the time frame relays and the two pulse receiving relays, so that the coded information in the transmitting equipment is transmerred to code relays in the two equipments.

According to another feature of the invention, the originating call loop set up by the remote equipment constitutes the receiving loop of the option signal, the local equipment being provided with means which cut off the loop when there is an option for a terminating call. The two equipments include a receiving relay which responds to this loop when it is not cut off by said means, in order to establish the transmission in the remote-local direction.

Other features and advantages of the invention will appear from the following description with reference to the accompanying drawings, in which.

Figures 1A, 1B, 1C:
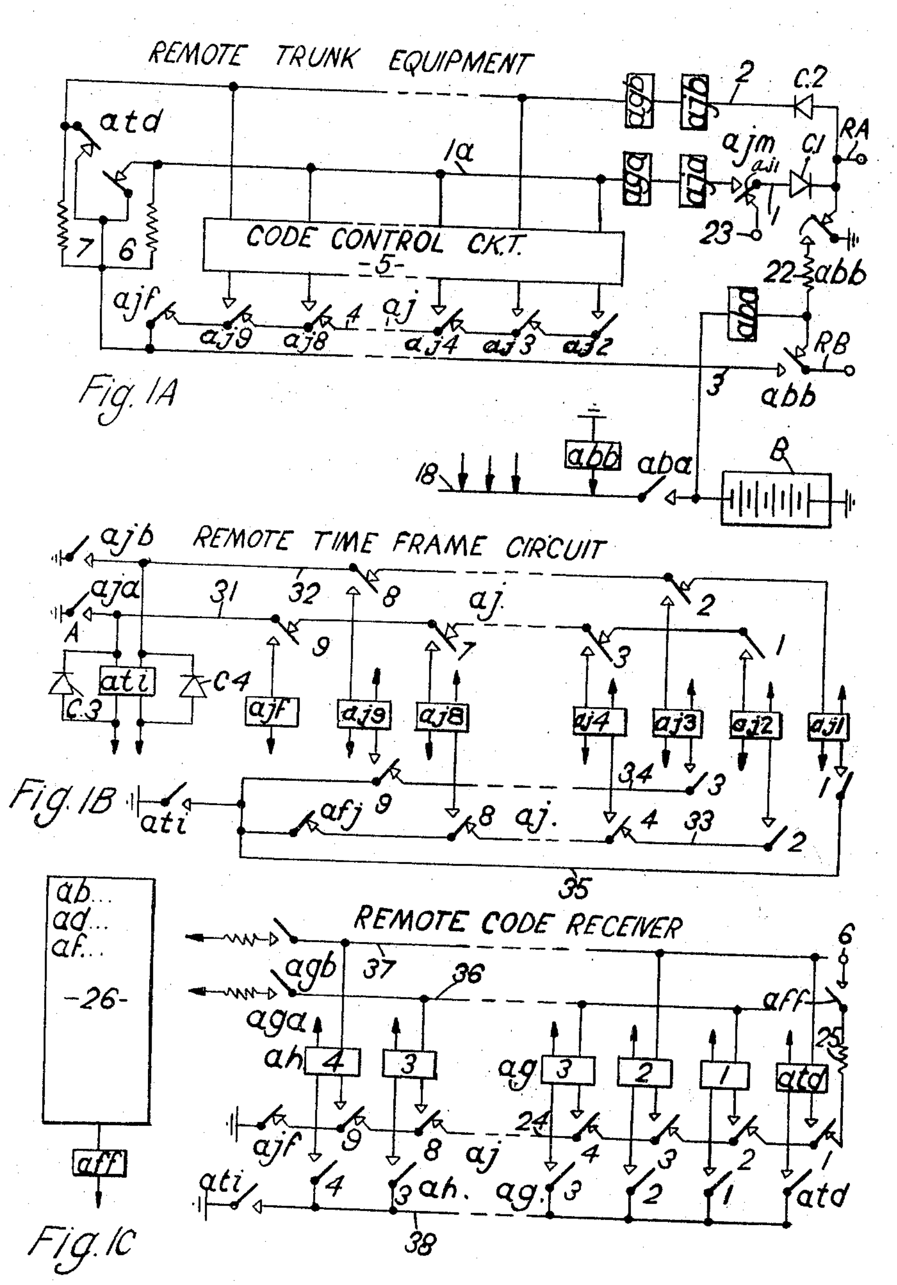
FIGS. 1A, 1B, 1C represent the circuits of the remote equipment in an embodiment of the invention involving transmission by means of strong or weak pulses.

The embodiments which will be described relate to telephone concentrators. It will be assumed that these concentrators have 24 lines divided into 4 groups of 6; each group, in the case of a crossbar switch, being defined by the motion towards the upper part or the lower part, of one of the 6 selection bars and by the motion towards the upper part or the lower part of a holding bar. It will be assumed that they are linked through a bundle of 7 pairs, six being conversation trunks and the 7th pair being the transmission trunk. The information to be transmitted will be:

(1)—The presence of an originating or terminating call, or a release, (2)—The direction of the transmission, (3)—The number of the group (4 possible numbers), or the order of release (a 5th number), and (4)—The number of the line in the group, or the number of the trunk to be released (6 numbers in the two cases).

The presence of an originating call will be signalled in a preliminary moment which will be omitted when the information has to be sent by the local equipment; the direction of transmission will be signalled in a first moment, and the presence of a terminating call, or a release, will be signalled by the same signal as the local-remote direction; the number of the group, or the order of release will be signalled by a combination of 4 bits, a signal of 4 bits permitting 6 combinations "2 out of 4"; and the number of the line in the group, or the number of the trunk, will be signalled by a second combination of 4 bits. These bits will be followed by an end moment to maintain the transmission linking for a time after the transmission of the last significant moment. For some details of these embodiments, reference may be made to a U.S. patent application No. 174,780 filed by Henquet, Cavin and Feuillepain and assigned to the same assignee as the present invention.

Figures 2, 2A, 2B, 2C, 2D:
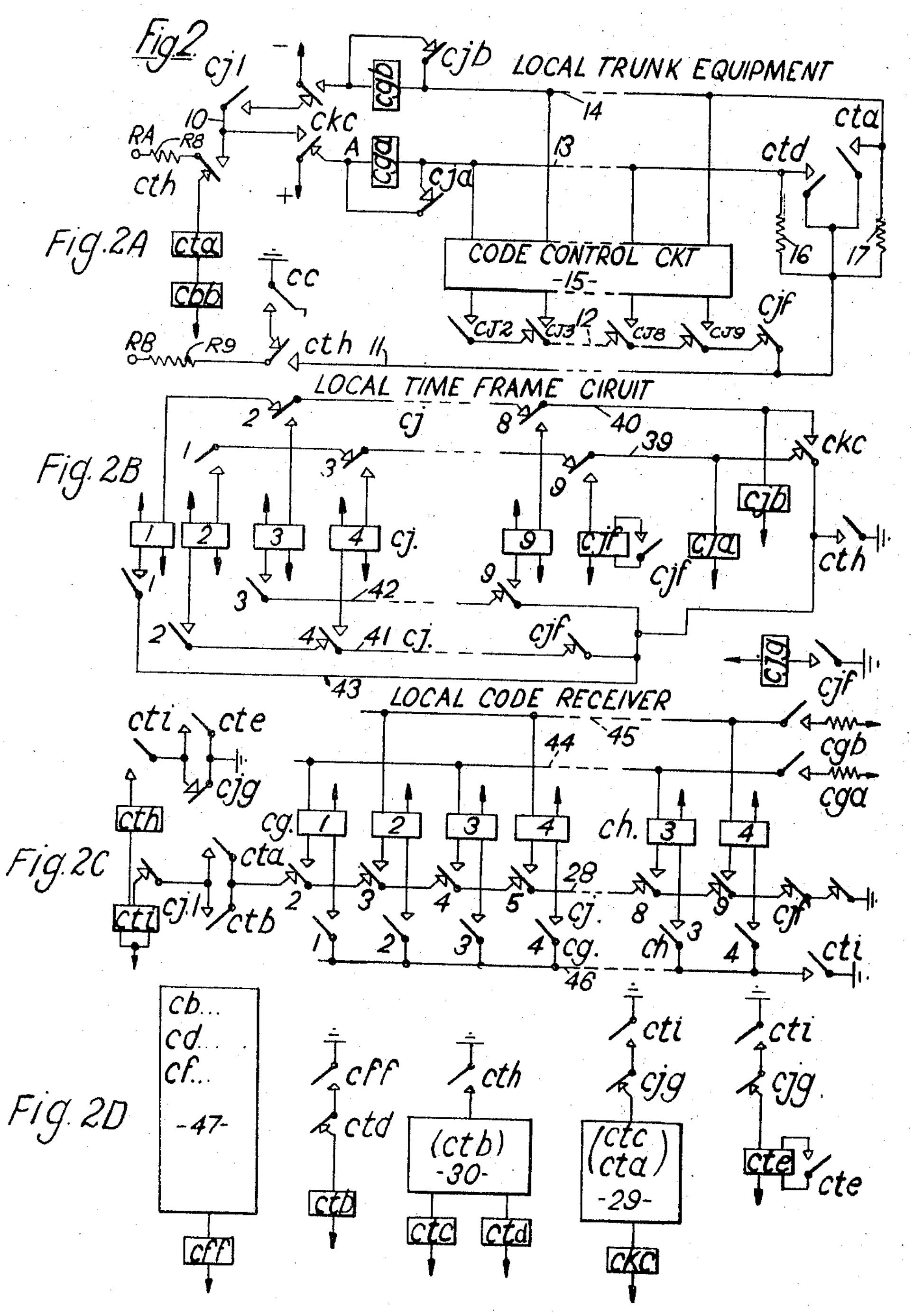
FIGS. 2A, 2B, 2C and 2D represent the circuits of the local equipment for the said embodiment.

In the two remote and local equipments, the circuits associated with the transmission trunk RA, RB, in the first embodiment, are shown in FIGS. 1A and 2A. Means are provided to control the remote battery B when they are in rest condition with respect to the transmission of information.

The remote circuit comprises two branches linked to wire RA: the negative branch 1, 1*a* and the positive branch 2. Said branches are biased by diodes C.1, C.2. The two parts of the negative branch are connected through a make contact of the first time frame relay *aj*.1; section 1 comprises diode C.1 and section 1*a* the responsive and marginal receiving relays *aja* and *aga*. The positive branch comprises diode C.2 and the responsive and marginal receiving relays *ajb* and *agb*. Return wire 3 is connected to wire RB through a make contact of sign relay *abb*. A chain of change-over contacts 4 comprising contacts of time frame relays *aj*.2–9 and *ajf* starts from return wire 3. At successive moments of the transmission, wires 1*a* and 2 are connected to wire 3 through chain 4 under the control of a code control circuit 5 for determining strong pulses when the information is transmitted by the remote equipment. At other moments, wires 1*a* and 2 are connected to wire 3 through resistances 6 and 7 which secure the passage of weak pulses. When the information is transmitted by the local circuit, the remote loop remains a direct loop due to the fact that resistances 6, 7 are short-circuited through rest contacts of marking relay *atd*, which is operated when the remote equipment is transmitting information.

The local circuit (FIG. 2A) which comprises compensating resistances R8, R9, is switched through change-over contacts of seizing relay *cth* (FIG. 2C). When this relay is in rest condition, wire RA is connected to the (negative) battery by *r–cth* through a calling relay *cta* which is a responsive relay, and a battery relay *cbb* which is a marginal relay. Wire RB is then linked through another contact *r–cth* to a battery key CC which has ground applied to it. When relay *cth* is operated, pulses of alternative signs (polarity) may be applied to wire RA through beating relay *ckc* (FIG. 2C): negative battery through *r–ckc* and *t–cj*.1, or positive battery through *t–ckc*, section of wire 10, *t–cth*, wire RA. Wire RB is then connected to return wire 11. A contact chain 12, comprising change-over contacts of time frame relays *cj*.2–9 and *cjf*, allows at the successive moments of the transmission the connection of wire 11 to two negative and positive return branches 13 and 14 respectively, under the control of code control circuit 15 for determining strong pulses when the information is transmitted by the local equipment. At other moments, wires 13 and 14 are connected to wire 11 through resistances 16, 17 which secure the passage of weak pulses. When the information is transmitted by the remote circuit, the local return loop remains a direct loop due to the fact that resistances 16, 17 are short-circuited through make contacts of marking relay *ctd* (FIG. 2D) which is operated when the remote equipment is transmitting information. The supply of the return branches is alternately effected through positive battery, *r–ckc*, marginal relay *cga*, negative branch 13, or negative battery, *t–ckc*, marginal relay *cgb* and positive branch 14.

Means provided for controlling the remote battery B will be described next. Battery wire 18 (FIG. 1A) is connected to this battery through a make contact of connecting relay *aba*, and sign relay *abb* is directly connected between wire 18 and ground. When connecting relay *aba* is in rest condition, wire 18 is therefore disconnected from the battery, and sign relay *abb* is also de-energized. The connecting relay *aba* is directly connected on one side to battery B. Through rest contacts of sign relay *abb*, the connecting relay is connected on the other side to wire RB and a ground is applied directly to wire RA. In the local circuit, the said ground causes relays *cta* and *ctb* (FIG. 2A) to be operated. The battery relay *cbb* signals that the remote battery is disconnected. The operation of calling relay *cta* remains without any effect, as will be seen further. By pushing on key CC, a ground may be applied directly to wire RB. In the remote circuit, the said ground operates connecting relay *aba*. Wire 18 is then connected to the battery, and sign relay *abb* is operated. Said relay suppresses ground from wire RA and applies it through *t–abb* to the maintaining circuit of relay *aba*, comprising resistance 22. It disconnects relay *aba* from wire RB and connects this wire through *t–abb* to return wire 3. In the local circuit, relay *cbb* falls back (as well as relay *cta*) and signals that the battery is connected; thereafter, key CC may be released. In the continuation of the description, the condition of the circuits, with relays *aba* and *abb* operated and the battery wire 21 connected to the battery, will be considered as being the rest condition.

In the remote circuit in rest condition, section 1 of the negative branch is connected through *r–aj*.1 and plug 23 to a calling circuit. In the said embodiment, on grounds of convenience, said calling circuit is a part of the code receiving circuit shown in FIG. 1C. Said circuit applies a resistant ground through a contact chain 24 comprising change-over contacts of time frame relays *aj*.1–9 and *ajf*, resistance 25 and a make contact of calling relay *aff*. In the concentrators described in the main patent, the relay operates when an originating call has been tested and identified, the information to be transmitted being then coded in the control circuit 5. Block 26 indicates the identification circuit which operates relay *aff*. In the local circuit, calling relay *cta* operates alone on said resistant ground (provided that seizing relay *cth* has not already operated by a simultaneous terminating call, as mentioned further). Said relay *cta* operates—on condition that the battery marginal relay *cbb* is in rest condition—through a circuit which also is a part, and for the same reasons, of the code receiving circuit shown in FIGS. 2C and 2D. Said circuit comprises a contact chain 28 comprising change-over contacts (in rest condition) of all the time frame relays *cj*.1–9 and *cjf*, contact *r–cbb* and contact *t–cta*, the latter bypassed by contact *t–ctb* for the originating calls, as mentioned further. Said circuit operates a first seizing relay *cti*, which is locked through a second seizing relay *cth* on contact *r–cjg* of a relay which will operate at the end of the transmission but which will be before bypassed by contact *t–cte*. Relay *cti* operates auxiliary relay *cte* which will come to work at the end of the transmission, under the control of contact *r–cjg*. It applies a ground to timer rate circuit 29 without starting up. Relay *cth* switches trunk RA, RB on the transmitting circuit. For lack of a simultaneous terminating call, it operates through option circuit 30 marking relay *ctd* which determines the transmission in the remote-local direction. The connection of the transmitting circuit is ineffective for the moment, as relays *ckc* and *cj*.1 are still in rest condition, so that neither the positive battery nor the negative battery is applied to wire RA. Marking relay *ctd* short-circuits resistances 16, 17, so that the code which may be contained in control circuit 15 has no effect on the pulses, and it starts the timer rate circuit. The operation of the latter will be translated into rhythmed beating of beating relay *ckc*.

In the local circuit, change-over contacts of relay *ckc* alternately apply the positive and negative battery voltages to wires RA and RB. The two branches of the local circuit alloted to wire RB are alternately short-circuited as the positive pole is applied to wire 13 and the negative pole to wire 14. The two branches of the remote circuit allotted to wire RA are alternately short-circuited through diodes C.1 and C.2 which switch negative pulses on wire 1, and positive pulses on wire 2. In the remote equipment, the time frame relays *aj*.1–9 and *ajf* are alternately operated through two change-over contact chains 31 and 32, on which the pulses are repeated by the responsive relay contacts *aja, ajb*. The operating and locking method of said relays on change-over contact chains 33 and 34 has been described in the above mentioned patents. It will be noted that for present circuit requirements, relay *aj*.1 is separately locked on wire 35 for the duration of the transmission. Seizing relay *ati* is connected to the two chains 31, 32, so as to be operated by the first pulse and to be maintained on the following pulses without falling back when the pulses are changing. For this purpose, its two windings are shunted by diodes C.3 and C.4. The locking circuit of the time frame relays is linked to ground through a make contact of seizing relay *ati*. At successive moments 1–9, the change-over contact chain 24 switches "on" the corresponding code receiving relays, alternately on wires 36 and 37 on which marginal relay contacts *aga, agb*, repeat the strong pulses. The relays which are operated, lock on wire 38 which is linked to ground through contact *t–ati*. These relays comprise relay *atd* which is operated through *t–agb* at moment 1 in the case in which the information is transmitted by the remote equipment to serve an originating call; relays *ag*.1–4 which receive the code of the six line group; and relays *ah*.1–4 which receive the code of the line number in the six line group (in the case of a release order, relays *ag*.1–4 receive the special code of said order, and relays *ah*.1–4 the code of number of the trunk to be released in the six trunk group). In the local equipment, the circuits are analogous with their time frame relays *cj*.1–9 and *cjf* operated alternately through wire 39, 40 and being locked on wires 41, 42 and 43, and their code receiving relays *cg*.1–4, operated alternately between wires 44, 45 and change-over contact chain 28 being locked on wire 46. However, chains 39, 40 are directly energized through *r–ckc* or *t–ckc* with said ground *t–cth*; and there is no code receiving relay which would correspond to *atd*, as in the local circuit the direction of the transmission is already determined by the operation (or the non-operation) of relay *ctd*. End relay *cjf* is a slow release relay, and when it is operated, it will operate auxiliary relay *cjg*. Moreover, two relays *cja, cjb*, connected to wires 39, 40, control short-circuit connections on relays *cga, cgb*. Due to these connections, the additional currents for loading or unloading the trunk when the polarity is reversed, avoid the pulse receiving relays. The pulse receiving relays, notwithstanding their marginal setting, would sometimes venture to be operated on the additional currents of weak pulses. Immediately after the polarity reversal, the corresponding relay *cja* or *cjb* operates and cancels the short-circuit, thus permitting the marginal relay to be operated if the pulse is a strong one.

At the first operation of relay *ckc*, a strong positive pulse is utilized on the trunk: positive pole, *t–ckc*, wire 10, *t–cth*, wire RA, wire 2 through diode C.2 and relays *ajb* and *agb*, *r–atd*, wire 3, wire RB, *t–cth*, wire 11, *t–ctd*, wire 14, relay *cgb* short-circuited through *r–cjb*, *t–ckc*, negative pole. At the same time, a pulse is applied to the local time frame circuit: ground, *t–cth, t–ckc*, chain 40, relay *cj*.1, and battery. Said pulse operates relay *cjb* which cuts off the short-circuit on relay *cgb*. Relays *ajb, agb* and *cgb* operate. A pulse is applied to the remote time frame circuit (FIG. 1B) through: ground, *t–ajb*, chain 32, relay *aj*.1, and battery. Said pulse operates the seizing relay *ati*. The first time frame relays are locked for the transmission duration, respectively on wire 35 and *t–ati* and on wire 43 and *t–cth*. Finally, marginal relay *agb* (FIG. 1A) operates relay *atd* (FIG. 1C): ground, chain 24, relay *atd*, wire 37, *t–agb* and battery. Relay *atd* which marks the transmission in the remote-local direction, is locked for the transmission duration on wire 38 and *t–ati*. Resistances 6, 7 are inserted in the remote transmission circuit, so that the remote code control circuit 5 short-circuits them at determined moments. The operation of relay *cgb* has no effect: resistances 16, 17 remain short-circuited through *t–ctd* and restore the local code control circuit in rest condition. The following pulses will be therefore weak or strong according to the coded information in the remote equipment. The negative pulses could be transmitted after the operation of the first time frame relays *aj*.1 and *cj*.1: negative pole, *r–ckc, t–cj*.1, wire 10, *t–cth*, wire RA; wire 1 with cell C.1, *t–aj*.1, wire 1*a* with relays *aja* and *aga*, etc.

The code is transmitted during the eight following moments. The timer relays *aja, ajb* alternately operate. The remote time frame relays are operated one after the other through *t–aja* and contact chain 31, or through *t–ajb* and contact chain 32. They are locked, then unlocked two moments later, on contact chains 33 and 34. The local time frame relays are operated one after the other through *r–ckc* (FIG. 2B) and contact chain 39, or through *t–ckc* and contact chain 40. Said relays are locked and unlocked on contact chains 41 and 42. Marginal relays *aga* and *cga*, or *agb* and *cgb*, are operated in the moments when the code control circuit 5 short-circuits resistance 6 or 7. During these moments, the corresponding code relays *ag*.1–4, *ah*.1–4 operate on wire 36 and *t–aga*, or wire 37 and *t–agb*, and are locked on wire 38 and *t–ati*. The alternate operation on wires 36 and 37 prevents the errors which could occur between a relay and the preceding one, owing to the fact that in chain 24, the change-over contact of the corresponding time frame relay may be operated with a delay after the contact of the marginal relay. The corresponding code relays *cg*.1–4 operate at the same time and in the same manner on wires 44 through *t–cga*, or 45 through *t–cgb*, chain 28 and blocking wire 46 through *t–cti*.

After the eight moments of the code, the local circuit applies an end pulse. In this case, the end pulse is the tenth pulse: it will therefore have the same sign (negative) as the temporary supply of current before the first pulse. Said pulse will be applied through relay *ckc* in rest condition, and it will be necessary to stop the timer circuit with relay *ckc* in rest condition. If the code had an odd number of moments, the end pulse would be an odd pulse, as in the preceding patents, and it would be necessary, is in said patents, to stop the timer circuit with relay *ckc* operated. The end pulse (which is a weak one) operates end relays *ajf* and *cjf*. Relay *cjf* closes its delay winding and operates its auxiliary relay *cjg*. Relay *cjg* cuts off the current supply of timer circuit 29 so that relay *ckc* will remain in rest condition. Relay *cjg* also cuts off relay *cte* which had closed its delay winding. Relay *cte* slowly releases. When it falls back, because relay *cjg* is now operated, the blocking circuit of relay *cti* through relay *cth* is cut off and the two seizing relays fall back. Relay *cth* cuts off wire 11 from wire RB, and in the remote circuit, relays *aja* and *ati* fall back. The release of seizing relays *cti, cth* and *ati* releases all the previously blocked time frame and code relays, as well as end relays *ajf* and *cjf*. However, relay *cjf* slowly releases. When said relay has fallen back, relay *ajg* falls back, and this restores the transmitting equipment to the rest condition.

In the case of a terminating call, the transmission starts in the local equipment which receives said call and contains the information to be transmitted, viz. the number of the requested line. This number is identified in embodiment, a remote call noted on a temporary supply of current determines the local remote direction, whereas the local-remote direction is determined by the suppression of the temporary supply of current, which prevents the notation of a remote call, directly followed by the first moment pulse which is a separating pulse the sign of which is opposite to the temporary supply of current. The complete sequence of transmitting pulses is represented in the following table:

| | Moments | | | | | | | | |
|---|---|---|---|---|---|---|---|---|---|
| | 0 | 1 | | 2 | 3 | 4 | 5 | 6 | 7 |
| Originating call | + | − | Group I | + | 0 | + | − | 0 | − |
| Terminating call | 0 | | II | + | 0 | + | 0 | + | |
| | | | III | 0 | − | + | − | 0 | |
| | | | IV | 0 | − | + | 0 | + | |
| | | | Release | + | − | 0 | − | 0 | |

| No. | Moments | | | | | |
|---|---|---|---|---|---|---|
| | 8 | 9 | 10 | 11 | 12 | Fin. |
| 1 | + | − | 0 | − | 0 | − |
| 2 | + | 0 | + | − | 0 | |
| 3 | + | 0 | + | 0 | + | |
| 4 | 0 | − | + | − | 0 | |
| 5 | 0 | − | + | 0 | + | |
| 6 | 0 | − | 0 | − | + | |

device 47 which comprises the notation relays *cb* . . . , *cd* . . . , *cf* . . . , described in the preceding patents. The identification device 47 operates relay *cff*. Relay *cff* operates the terminating call relay *ctb* through contact *r–ctd*. If the operation of relay *ctd* has already marked an originating call transmission, relay *ctb* does not operate. Relay *ctb* operates relay *cti* through chain 28, and this relay is blocked through relay *cth*. Said relay *cth* operates option relay *ctc* by preventing the operation of relay *ctd*, and connects the transmitting circuit (wires 10, 11) to trunk RA, RB. When relay *ctd* is in rest condition, this circuit comprises resistances 16, 17. Said resistances will be short-circuited at determined moments of the transmission by means of the code control circuit 15 which contains the code of the number to be transmitted. The current supply of the trunk is not yet established owing to the fact that wire 10 is cut off at contact *t–cj*.1. Relay *cti* starts the timer circuit which causes the beating of relay *ckc*. At the first operation of this relay, the "positive" pulse is transmitted but it is now a weak pulse and the marginal relay *agb* does not operate in the remote circuit. The first time frame relays *aj*.1 and *cj*.1 are operated but the marking relay *atd* remains in rest condition in the remote circuit, and contacts *r–atd* allow resistances 6, 7 to be short-circuited in wires 1, 2.

The operation proceeds and comes to an end as in the case of an originating call, with the difference that the strength of pulses which determines the code established on relays *ag*.1–4, *ah*.1–4, *cg*.1–4 and *ch*.1–4, now depends upon the local code control circuit 15 instead of remote circuit 5.

Figure 3A:
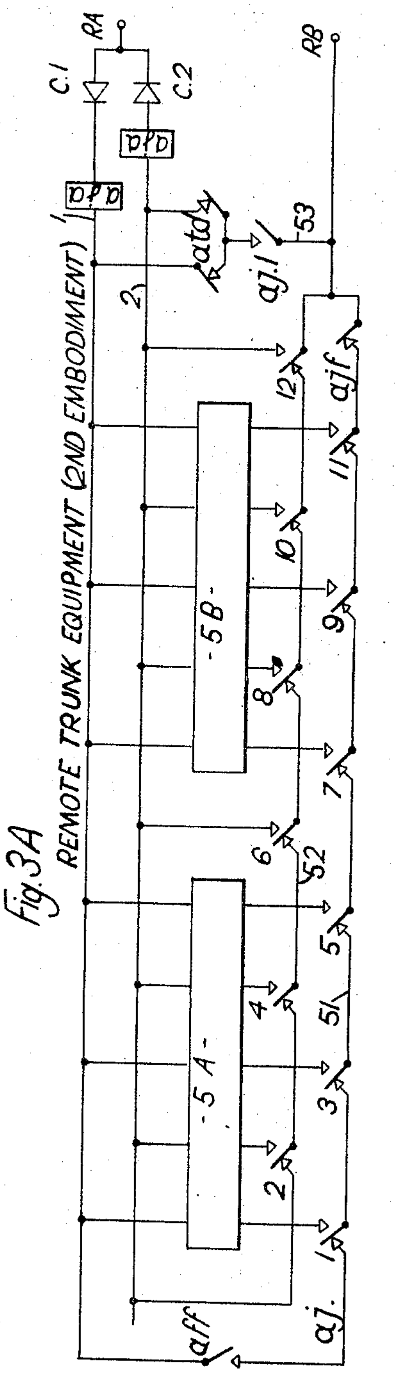
FIGS. 3A and 3B represent the circuits associated with the transmitting trunk in the two equipments, in a second embodiment of the invention involving transmission by means of present or absent pulses.
Figure 3B:
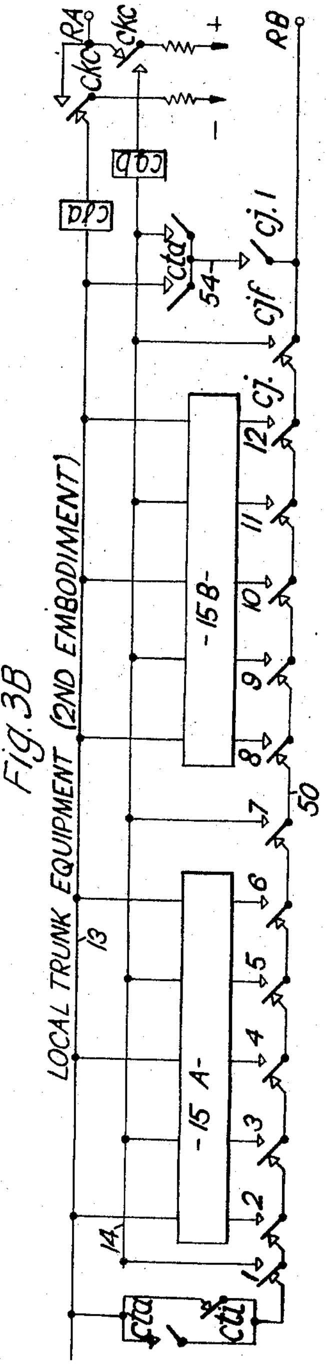
Figures 4A, 4B:
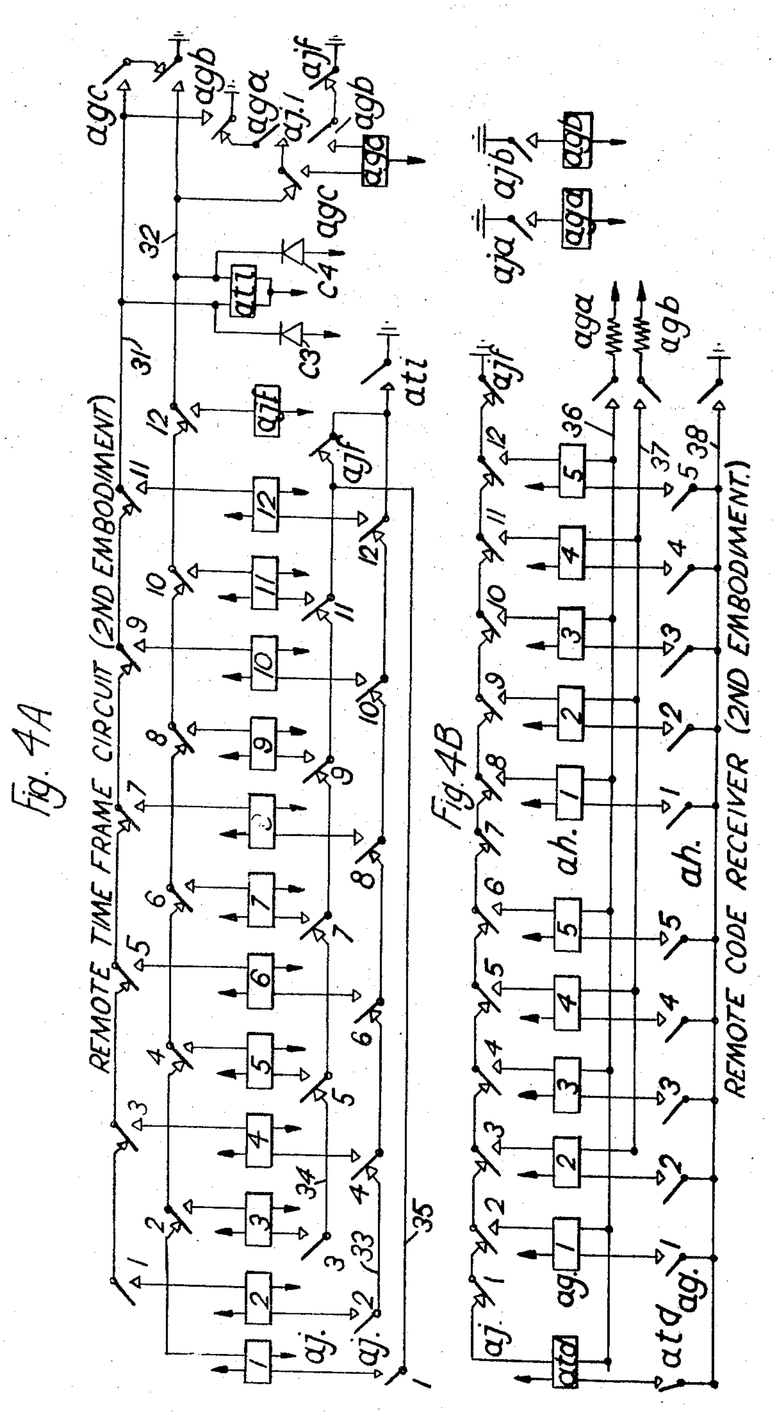
FIGS. 4A and 4B represent the circuits associated in the remote equipment comprised in the second embodiment.
Figures 5A, 5B:
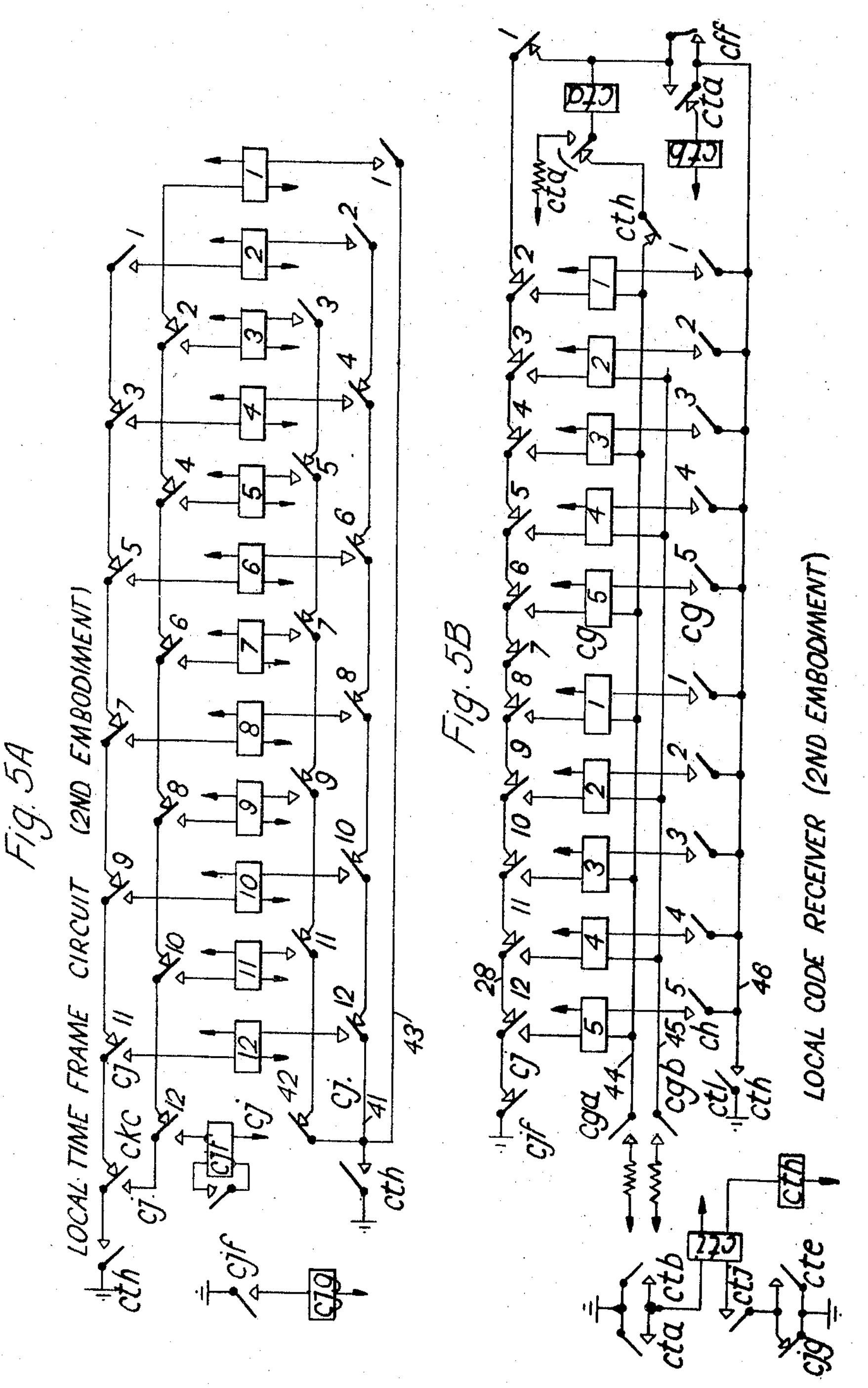
FIGS. 5A and 5B represent the circuits associated in the local equipment comprised in the second embodiment.

The embodiment shown in FIGURES 3 to 5 will be now described. In said embodiment, the information has to be transmitted by means of pulses of alternate sign but uniform strength, certain pulses of which will be omitted, but no more than one at a time. The information to be transmitted is assumed to be the same as in the preceding embodiment: a remote call signal, a transmission directing signal, a figure from 1 to 5 for the 4 line groups and the release order, and a figure from 1 to 6 for the number of the line in the group or the number of the trunk to be released in the bundle. The separate numbers or signals which may start or end in a 0 will be separated by an always present timer pulse. Digits from 1 to 6 will have to be coded on 5 moments instead of 4, it being recognized that combinations comprising more than one 0 at a time have to be omitted. The call signals and the directing signals could be separately transmitted as in the preceding embodiment; but in order to save one transmission moment and obtain some simplifications, it is provided that, in the present It will be understood that for the transmission of timing, the omitted pulses (0) have to be interpreted each time as a pulse of sign opposite to that of the preceding pulse. The manner in which this interpretation may be carried into effect will be seen later. Concerning code transmission, the positive or negative pulses have to be interpreted as present pulses (X) independently of their sign. For instance, the code of No. 5 is 0.X.X.0.X. The sign depends upon the order of the moment. In this case, + for the even moments and − for the odd moments. In this embodiment, it happens that the separating pulses and the end pulse are all odd pulses (−), but that is not a condition.

Referring to FIGS. 3A and 3B, in the rest condition of the transmitting trunk, a positive temporary supply of current is applied in the local circuit, to wire RA through the positive pole, *r–ckc*, and to wire RB through the negative pole, *r–ckc*, through relay *aga*, through *r–cti* and the change-over contact chain 50 comprising rest contacts of all the moment relays *cj*.1–12, *cjf*. In the remote circuit, the positive branch 1 comprising diode C.1 and relay *aja* is not connected to wire RB, and the negative branch 2 comprising diode C.2 and relay *ajb* is locked by its diode for this current supply polarity. An originating call is translated into the closure of contact *t–aff* which connects the positive branch 1 to wire RB through a change-over contact chain 51 comprising rest contacts of odd moment relays *aj*.1–11, *ajf*. It will be understood that it is easy to manage; more particularly by means of contacts of the first moment relay *aj*.1, to let pass also the loop through the change-over contact chain 52 comprising rest contacts of the even momement relays *aj*.2–12, so as to ascertain that all the moment relays are in rest condition. The closure of the remote call loop operates relay *cga* in the local circuit provided that seizing relay *cti* is not already operated by a local call. Relay *cga* connects wire 44 to the battery, and remote call relay *cta* is operated on said battery through change-over contact chain 28 and contact *r–cth*. Through a cross-over change-over contact, relay *cta* is at once connected to another battery. Through its make contacts, relay *cta* secures the connection between wire 13 and chain 50 in the transmitting circuit, prepares its blocking circuit on wire 46, operates seizing relay *cti*, and prepares the direct connection from wires 13 and 14 to wire RB independently of the local code control circuit 15A, 15B. Relay *cti* locks itself through relay *cth*. Relay *cti* also operates *cte* and starts timer circuit 29 (FIGURE 2). Relay *cth* applies the locking ground to wire 46, and relay *cta* locks itself on said ground. In the remote circuit the closing of the call loop operates relay *aja* which operates repeating relay *aga*. This relay operates seizing relay *ati* in the moment circuit by applying a ground wire 31, and relay *atd* in the code circuit, by applying a battery to wire 36. Relay *atd* locks itself on wire 38 to ground through *t–ati*. Relay *atd* will secure the control of the transmitting loop through the local control circuit 5A, 5B. The detail of the locking of various relays is such that if relay *atd* may find the time to operate in the remote equipment, relay *cta* will safely operate in the local equipment. As a matter of fact, if relays *cti* and *cth*, which may be opated by a local call, have not prevented the operation of relays *cga* and *cta*, these will be held; and if they have prevented it, relay *atd* will not be able to operate. It will be seen further which is the locking relay in the case of a local call (terminating call).

The first operation of time-pulse relay *ckc* provides a separating pulse. The first moment relay *cj*.1 is first set through *t–ckc* and chain 40 comprising the even change-over contacts *cj*.2–12 in rest condition; it locks itself on wire 43 for the duration of transmission. A negative pulse is then applied to the transmitting trunk: negative pole, wire RA, branch 2 with cell C.2 and rerest condition and change-over contact *cj*.1 in make contacts *aj*.2–12 in rest condition, wire RB; chain 50 comprising all the change-over contacts *cj*.2–12 and *cjf* in rest condition and change-over contact *cj*.1 in make condition, wire 14, relay *cgb*, positive pole. Relays *ajb* and *cgb* operate. The operation of relay *cgb* has no effect during a separating moment. Relay *ajb* operates its repeating relay *agb* which applies a ground to wire 32 and operates the first moment relay *aj*.1 through the even change-over contacts *aj*.2–12 in rest condition. Relay *aj*.1 locks itself on wire 35 for the duration of transmission. The operation of relay *agb* has no effect concerning the coding in a separating moment. The first moment relays short-circuit the code control circuit in the information receiving equipment: in the remote circuit, a connection 53 would be established through *t–al*.1, *r-atd* between wires 1, 2 and wire RB, in a transmission in the local-remote direction, with relay *atd* in rest condition; in the local circuit, a connection 54 would be established through *t–cj*.1, *t–cta* between wire RB and wires 13, 14, in the transmission in the remote-local direction.

In the following moments, a code will be transmitted, the first pulse of which could be omitted in determined combinations. In the remote moment circuit, a pulse will have to be applied to chain 31 at the first of these moments (the second of the transmission), whether relay *aga* be operated or in rest condition. For this purpose, in the first moment of the transmission relay *agb* operates storage relay *agc* which locks itself through *r–aga*, *t–aj*.1. At the second moment, if there is no pulse, chain 31 will be energized through *r–agb*, *t–agc*. If there is a pulse, relay *aga* will unlock relay *agc* and will directly energize chain 31 through *t–aga*. If, after this pulse, the following pulse is omitted, wire 32 will be energized through *r–aga*, *t–aj*.1, *r–agc*. If there is a pulse, relay *agb* will directly energize wire 32 through *t–agb* and will again operate relay *agc*, and so on. Each omitted pulse will thus energize chain 31 if the preceding pulse had energized chain 32, or it will energize wire 32 if the preceding pulse had energized chain 31. In any case, chains 31 and 32 will be alternately energized, in order to ensure the proper operation of the moment relays.

The transmission of the information thus proceeds under the control of concerning the two coded numbers, two parts 5A, 5B of the remote code control circuit, with a separating pulse between the two numbers, at the 7th moment of the transmission. The end pulse, in this case, is the thirteenth, i.e. an odd pulse provided by an operation of the time-pulse relay *ckc*. The timer circuit is therefore caused to stop without releasing said relay, as in the previous patents. Otherwise, the release of the transmission could be affected as in the preceding embodiment.

In the case of a terminating call, call relay *cff* operates marking relay *ctb* provided that marking relay *cta* be not already operated by an originating call: change-over contact chain 28, *t–cff*, *r–cta*, relay *ctb*. Relay *ctb* operates relay *cti*, and the latter locks itself through relay *cth*, as for an originating call. As mentioned above, the operation of relay *cti* prevents the operation of relay *cga* so that from this moment an originating call can no longer be received. Relay *ctb* is then held through *r–cta* on wire 46 supplied with current through *t–cth*. The timer circuit starts and the first pulse is transmitted as previously. However, as there is no originating call pulse, relay *atd* remains in rest condition in the remote circuit. Consequently, from the first moment, when *cj*.1 and *aj*.1 were operated, switching 53 is established in the remote circuit for eliminating the code control circuit 5A, 5B, whereas switching 54 is not established in the local circuit and allows to control circuit 15A, 15B, to control the pulses according to the coded information in the local equipment.

Whereas this invention has been described in connection with specific embodiments, it will be clearly understood that this description has been made only by way of example and is not a limitation on the scope of the invention.

We claim:

1. A signalling system for exchanging pulses between local equipment and remote equipment over transmission lines extending therebetween comprising means in said local equipment and in said remote equipment for providing coded sequences of strong and weak pulses including pulses having amplitudes of different polarity, said means including relays for inserting resistances in series with the transmission lines between the local and remote equipment to establish said weak pulses in the sequences of pulses, said local equipment and said remote equipment including marginal relays responsive to the strong pulses to transfer corresponding signals to code receiving circuits, said remote equipment including timer relays responsive to all the pulses to ensure the reception of system timing information, said local equipment including means for signalling the direction of transmission by establishing a particular coded sequence, said remote equipment including means for transmitting sequences of said weak and strong pulses to the local equipment, and means in said local equipment for utilizing the pulses received from the remote equipment in determining the condition of the system.

2. A signalling system for exchanging coded data signals of alternate polarities and of varying amplitudes between local equipment and remote equipment interconnected by a trunk line extending therebetween comprising means for generating coded data signals composed of pulses of relatively high amplitude representing both code and timing information intermixed with pulses of relatively low amplitude representing only timing information, transmitting means in said local equipment for transmitting said data signals over said trunk line to said remote equipment, receiving means in said remote equipment for detecting the transmission of each of said data signals according to said polarities and for detecting the code of the data signals according to said amplitude, transmitting means in said remote equipment for generating coded data signals and for transmitting coded data signals over said trunk line to said local equipment, and receiving means in said local equipment for utilizing coded data signals received from the remote equipment to determine the condition of the system.

3. A signalling system as set forth in claim 2 wherein each of said polarity conditions comprises a separate code moment of transmission and wherein said receiving means for detecting code includes a pair of polarized devices for detecting alternate ones of said code moments.

4. A signalling system as set forth in claim 3 wherein the said means for detecting the code of the data signals includes means controlled by said polarized devices for evaluating said signals during each of said code moments.

References Cited by the Examiner

UNITED STATES PATENTS

| | | | |
|---|---|---|---|
| 1,638,330 | 8/1927 | Flynn | 340—158 |
| 2,444,039 | 6/1948 | Goddard | 340—147 |
| 2,490,048 | 12/1949 | Gohorel | 340—147 |
| 2,512,639 | 6/1950 | Gohorel | 340—147 |

NEIL C. READ, *Primary Examiner.*

WILLIAM C. COOPER, *Examiner.*

D. YUSKO, L. A. WRIGHT, *Assistant Examiners.*